(12) United States Patent
Wilger

(10) Patent No.: US 10,462,985 B2
(45) Date of Patent: Nov. 5, 2019

(54) MULTI-POSITION SPRAYER COMPONENT FOR SPRAYING IMPLEMENTS

(71) Applicant: Wilger Industries Ltd., Saskatoon (CA)

(72) Inventor: Wilfred H. Wilger, Saskatoon (CA)

(73) Assignee: Wilger Industries Ltd., Saskatoon, Saskatchewan (CA)

( * ) Notice: Subject to any disclaimer, the term of this patent is extended or adjusted under 35 U.S.C. 154(b) by 15 days.

(21) Appl. No.: 15/897,996

(22) Filed: Feb. 15, 2018

(65) Prior Publication Data

US 2019/0166775 A1 Jun. 6, 2019

(30) Foreign Application Priority Data

Dec. 5, 2017 (CA) ...................................... 2987646

(51) Int. Cl.
| | | |
|---|---|---|
| *A01G 25/09* | (2006.01) | |
| *B05B 12/16* | (2018.01) | |
| *B05B 15/658* | (2018.01) | |
| *B05B 15/14* | (2018.01) | |
| *A01M 7/00* | (2006.01) | |
| *B05B 1/16* | (2006.01) | |
| *B05B 1/30* | (2006.01) | |

(52) U.S. Cl.
CPC ............... *A01G 25/09* (2013.01); *A01M 7/00* (2013.01); *B05B 12/16* (2018.02); *B05B 15/14* (2018.02); *B05B 15/658* (2018.02); *B05B 1/1645* (2013.01); *B05B 1/3053* (2013.01)

(58) Field of Classification Search
CPC ....... A01G 25/09; B05B 12/16; B05B 15/658; B05B 15/14; B05B 1/1645; B05B 1/3053; A01M 7/00
USPC ........... 239/162, 164, 169, 317, 587.1–587.5
See application file for complete search history.

(56) References Cited

U.S. PATENT DOCUMENTS 3,943,960 A * 3/1976 Syrenne ................... A61L 2/18
137/268

* cited by examiner

*Primary Examiner* — Christopher S Kim
(74) *Attorney, Agent, or Firm* — Patterson Thuente Pedersen, P.A.

(57) ABSTRACT

A nozzle body apparatus having a conduit mounting member with a conduit input adapted to be connected such that liquid passing through a liquid conduit flows into the conduit input and out through a conduit output. A component mounting member has a component input releasably connected to the conduit output, a component attachment element, and a component output. Liquid passing out the conduit output flows into the component input then through a sprayer component connected to the component attachment element to the component output and then to a nozzle. The component mounting member is connectable to the conduit output in a first orientation where the component attachment element extends from the conduit output in a first direction, and is connectable to the conduit output in a second orientation where the component attachment element extends from the conduit output in a second different direction that is different from the first direction.

7 Claims, 3 Drawing Sheets

MULTI-POSITION SPRAYER COMPONENT FOR SPRAYING IMPLEMENTS

FIELD OF THE INVENTION

This disclosure relates to the field of spraying equipment and in particular nozzle body assemblies for spraying equipment.

BACKGROUND

Implements for spraying liquid chemicals on fields, roads and the like typically include a liquid container, a laterally extending liquid conduit mounted on a boom with nozzle bodies connected to the liquid conduit at a desired spacing, and a pump operative to draw liquid from the container and to direct pressurized liquid through the conduit to nozzle\s mounted in the nozzle bodies.

In agricultural operations such chemicals include herbicides, pesticides, fungicides, fertilizers, and the like, and each field may be sprayed several times to apply the various chemicals needed during a growing season and between growing seasons. Thus it is desirable to provide spraying implements with very wide coverage and laterally extending booms of 120 feet or more in length.

It is also necessary to move such spraying implements from field to field along roadways, requiring the wide booms to be folded to a narrow width for transport. In wide sprayers the booms are mounted to a vehicle carrying the liquid tank and related equipment and extend about 60 feet or more to the right and left of the vehicle. Such sprayer boom assemblies are disclosed for example in U.S. Pat. No. 6,402,051 to Humpal and U.S. Pat. No. 7,669,784 to Sobolik, and in United States Published Patent Application Number 2004/0238659 of Wubben et al.

It can be seen that the boom structures often fold several times to achieve a transport position, and it can be seen as well that the booms must be structurally designed to support themselves from inner ends attached to the vehicle. U.S. Pat. No. 6,837,446 to Jesse discloses a triangular boom structure to provide the required strength, and the liquid conduit is mounted inside the structure.

The nozzle bodies are attached to the liquid conduit and may be configured to hold several movable nozzles to accommodate a wide range of liquid application rates for example as illustrated in United States Published Patent Application Number 2009/0184182 of Beeren and U.S. Pat. No. 9,027,853 to Langkamp. Also solenoid valves are commonly added for pulse width modulation of the nozzles to adjust sprayer rates which add further bulk. The nozzle bodies themselves are generally of molded plastic and are very light weight however the solenoid valves are relatively heavy as they contain metal coils, plungers and the like.

The solenoid valves are typically in elongated housings. Often the solenoid valves will extend a relatively significant distance out from the nozzle body, placing torque on the nozzle body which can lead to damage in rough field conditions. The solenoid valve commonly extends perpendicularly out from the sprayer boom which increases the torque exerted on the boom fitting member attaching the nozzle body to the liquid conduit or boom. To reduce this torque it is also known to configure the solenoid valves so same are close to the boom fitting member and extend parallel to the boom.

The size and configuration of the nozzle bodies can be problematic when arranging the bodies on the boom as care must be taken to ensure the nozzle bodies do not contact any part of the apparatus when folding the booms between the operating position and the transport position.

SUMMARY OF THE INVENTION

The present disclosure provides a spraying apparatus that overcomes problems in the prior art.

In a first embodiment the present disclosure provides a nozzle body apparatus. The apparatus comprises a conduit mounting member comprising a conduit input adapted to be connected to a liquid conduit such that liquid passing through the liquid conduit flows into the conduit input and out through a conduit output of the conduit mounting member. A component mounting member comprises a component input releasably connected to the conduit output, a component attachment element, and a component output. The component attachment element is configured such that liquid passing out the conduit output flows into the component input then through a sprayer component connected to the component attachment element to the component output. The component mounting member is connectable to the conduit output in a first orientation where the component attachment element extends from the conduit output in a first direction, and is connectable to the conduit output in a second orientation where the component attachment element extends from the conduit output in a second direction that is different from the first direction. A nozzle member is connected to the component mounting member such that liquid flowing out through the component output flows into a nozzle member input and out of the nozzle member through a nozzle mounted in the nozzle member.

In a second embodiment the present disclosure provides sprayer apparatus comprising a sprayer boom assembly extending laterally from a spray vehicle configured to move in an operating travel direction, the sprayer boom assembly comprising a boom structure and a liquid conduit mounted along the boom structure. A conduit mounting member comprises a conduit input connected to the liquid conduit such that liquid passing through the liquid conduit flows into the conduit input and out through a conduit output of the conduit mounting member. A component mounting member comprises a component input releasably connected to the conduit output, a component attachment element, and a component output. A sprayer component is connected to the component attachment element such that liquid passing out the conduit output flows into the component input then through the sprayer component to the component output. The component mounting member is connectable to the conduit output in a first orientation where the sprayer component extends from the conduit output in a first direction, and is connectable to the conduit output in a second orientation where the sprayer component extends from the conduit output in a second direction that is different from the first direction. A nozzle member is connected to the component mounting member such that liquid flowing out through the component output flows into a nozzle member input and out of the nozzle member through a nozzle mounted in the nozzle member.

The nozzle apparatus of the present disclosure provides added flexibility for positioning of sprayer components such as solenoid valves and the like and thus facilitates positioning such components in a location suited to avoiding damage.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
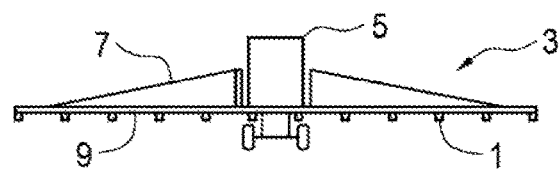
FIG. 1 is a schematic rear view of an embodiment of the nozzle apparatus of the present disclosure mounted on the sprayer boom assembly of a spray vehicle.
Figure 2:
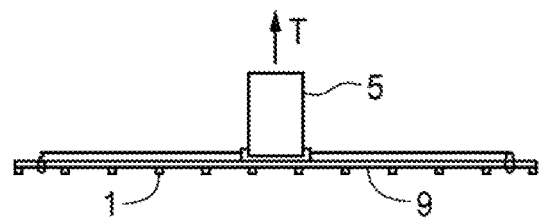
FIG. 2 is a schematic top view of the spray vehicle and embodiment of FIG. 1.

FIG. 1 illustrates an embodiment of a nozzle apparatus 1 of the present disclosure. As schematically illustrated in FIGS. 1 and 2, the nozzle apparatus 1 is typically mounted on a sprayer boom assembly 3 extending laterally from a spray vehicle 5 configured to move in an operating travel direction T. The sprayer boom assembly 3 typically comprises a boom structure 7 and a liquid conduit 9 mounted along the boom structure 7. The nozzle apparatuses 1 are spaced along the spray boom assembly 3 and connected to the liquid conduit The nozzle apparatus 1 comprises, as schematically illustrated in FIG. 3, a conduit mounting member 11 comprising a conduit input 11A adapted to be connected to the liquid conduit 9 such that liquid LQ passing through the liquid conduit 9 flows into the conduit input 11A and out through a conduit output 11B of the conduit mounting member 11.

A component mounting member 13 comprises a component input 13A releasably connected to the conduit output 11B, a component output 13B, and a component attachment element 13C. The component attachment element 13C is configured such that liquid passing out the conduit output 11B flows into the component input 13A then through the a sprayer component 15 that can be connected to the component attachment element 13C, and then to the component output 13B.

Figure 3:
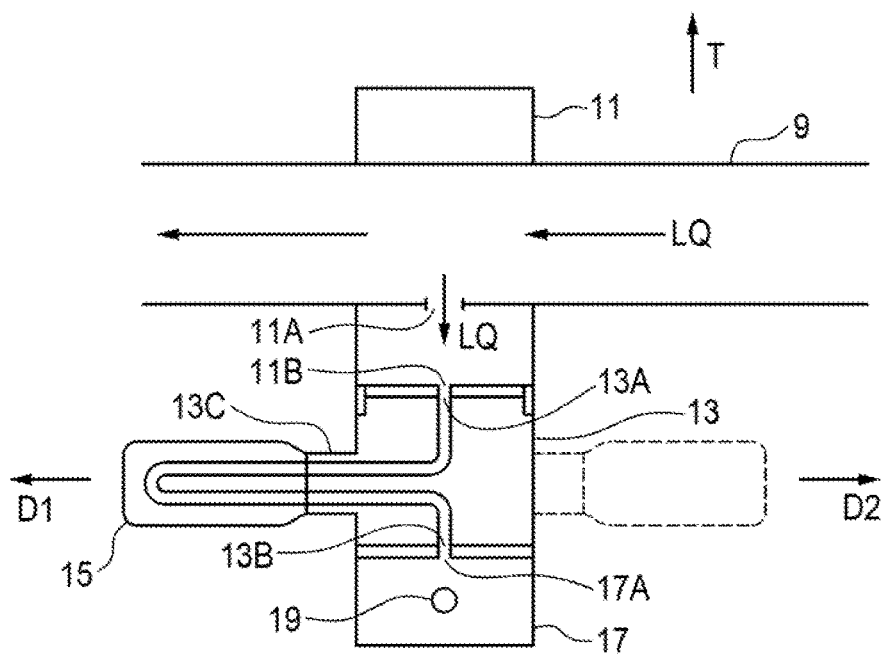
FIG. 3 is a schematic cut-away top view of the embodiment of the nozzle apparatus of FIG. 1.

The component mounting member 13 is connectable to the conduit output 11B in a first orientation shown by solid lines in FIG. 3 where the component attachment element 13C extends from the conduit output 11B in a first direction D1, and is connectable to the conduit output in a second orientation shown by phantom lines in FIG. 3 where the component attachment element 13C extends from the conduit output in a second direction D2 that is different from the first direction D1.

A nozzle member 17 is connected to the component mounting member 13 such that liquid flowing out through the component output 13B flows into a nozzle member input 17A and out of the nozzle member 17 through a nozzle 19 mounted in the nozzle member 17.

The sprayer component 15 will typically be a solenoid valve, diaphragm assembly, or the like.

Figure 5:
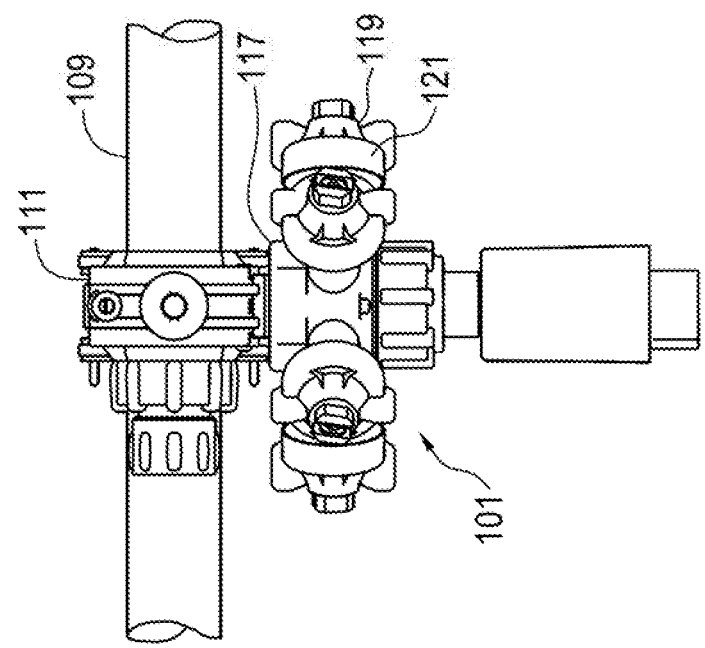
FIG. 5 is a top view of a nozzle apparatus of the prior art.

FIG. 5 schematically illustrates one configuration of a prior art nozzle apparatus 101 with a conduit mounting member 111 connected to a liquid conduit 109 and with a nozzle member 117 connected directly to the conduit mounting member 111. The illustrated nozzle member 117 is a turret type with a plurality of nozzle holders 121. A nozzle 119 is mounted to each nozzle holder 121 and the turret nozzle member 117 can be rotated such that liquid can be sprayed through a selected one of the nozzle 119. The sprayer component 115, commonly a solenoid valve, extends generally perpendicular to the liquid conduit 109 and conduit mounting member 111 and can generate significant torque stresses on the conduit mounting member 111. While a turret type nozzle body is illustrated any other nozzle body configuration could be used as well.

Figure 6:
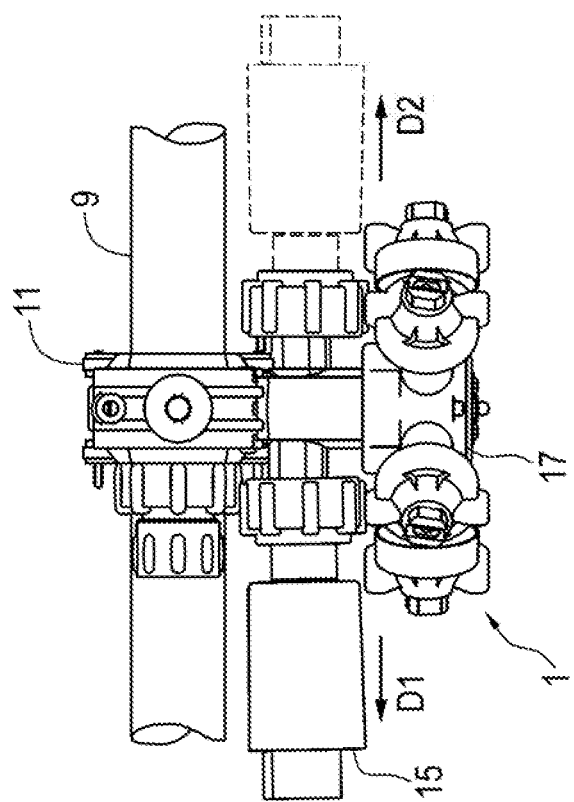
FIG. 6 is a top view of the embodiment of the nozzle apparatus of FIG. 3.

FIG. 6 schematically illustrates a nozzle apparatus 1 of the present disclosure where the sprayer component 15 is very close to the liquid conduit 9 and conduit mounting member 11 and generates significantly less torque stresses on the conduit mounting member 11 compared to the nozzle apparatus 101. The illustrated position of the sprayer component 15 is known in the prior art to relieve stress, however in the presently disclosed nozzle apparatus 1 the component mounting member 13 can be positioned so the sprayer component 15 extends in either of the illustrated first and second directions D1, D2 to allow flexibility in positioning.

Figure 4:
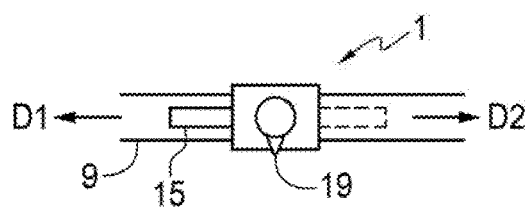
FIG. 4 is a schematic rear view of the embodiment of the nozzle apparatus shown in FIG. 3.

FIG. 4 schematically illustrates a rear view of the nozzle apparatus 1 shown in FIG. 3 where the liquid conduit 9 is oriented substantially perpendicular to the operating travel direction T, the first direction D1 is substantially perpendicular to the operating travel direction T, and the second direction D2 is substantially perpendicular to the operating travel direction T and oriented at a 180 degree angle with respect to the first direction D1.

Both the first and second directions D1, D2 are substantially horizontal and aligned with the liquid conduit 9.

Figure 7:
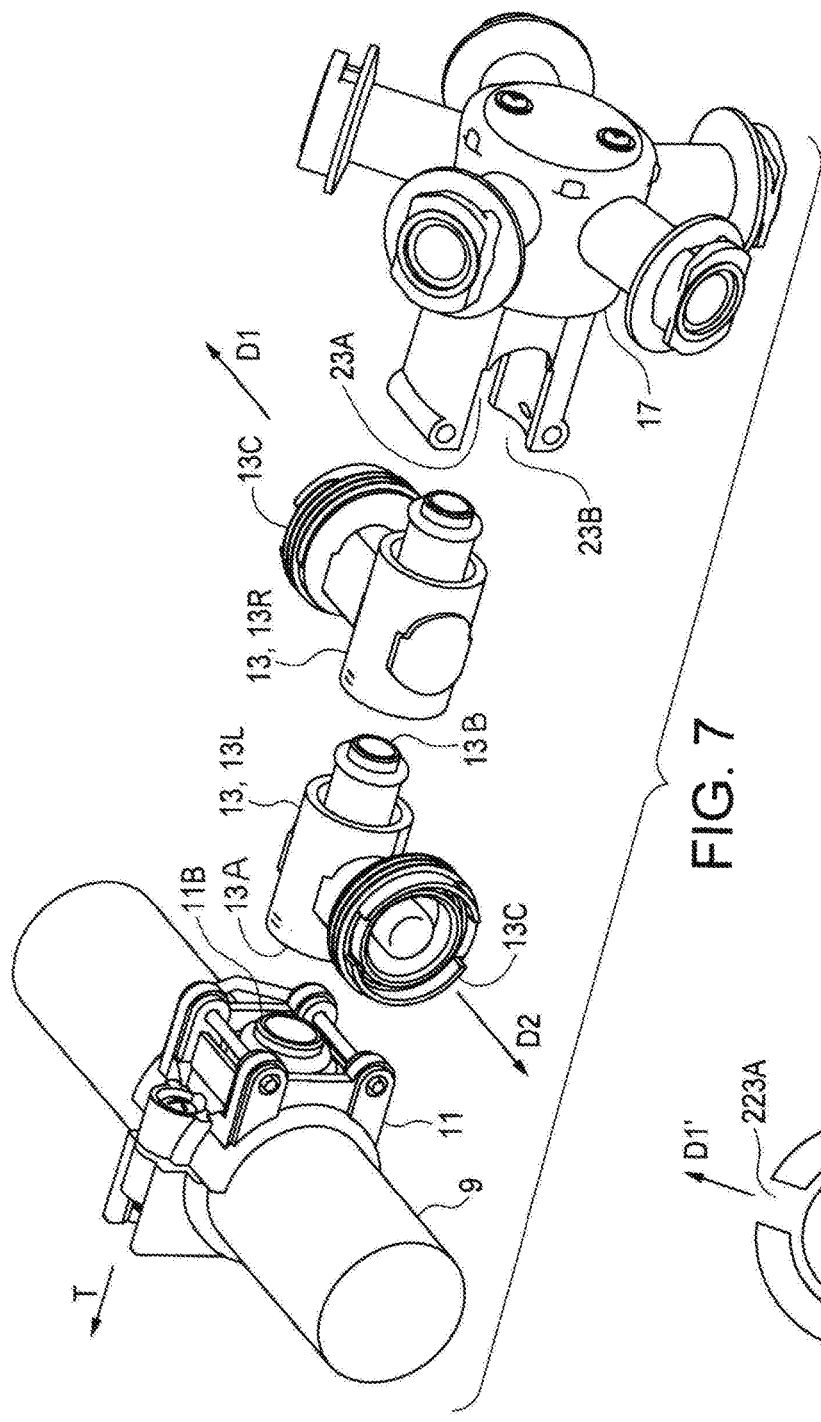
FIG. 7 is an exploded view of the embodiment of the nozzle apparatus of FIG. 3 showing the possible positioning of the component attachment element in either the first or second direction.

FIG. 7 illustrates the nozzle apparatus 1 in an exploded perspective view with the component mounting member 13 shown in a first orientation 13R and a second orientation 13L. The component input 13A and the component output 13B are substantially aligned, and the component attachment element 13C extends laterally from the aligned component input 13A and component output 13B.

The nozzle member 17 defines first and second slots 23A, 23B, and the component mounting member 13 is connected to the conduit output 11B in the first orientation 13R by positioning the component attachment element 13C in the first slot 23A such that the component attachment element 13C extends in the first direction D1, to the right of the conduit mounting member 11. Alternatively the component mounting member 13 can be connected to the conduit output 11B in the second orientation 13L by positioning the component attachment element 13C in the second slot 23B such that the component attachment element 13C extends in the second direction D2 to the left of the conduit mounting member 11.

With the illustrated configuration the component input 13A and the component output 13B are substantially aligned in a direction substantially perpendicular to the liquid conduit 9 and aligned with the operating travel direction T.

While the illustrated slots 23A, 23B are defined in the nozzle member 17, it can be seen that the slots 23A, 23B could instead be defined in the conduit mounting member 11. The slots 23A, 23B could also be configured so the component attachment element 13C extend up and down or in any direction desired.

Figure 8:
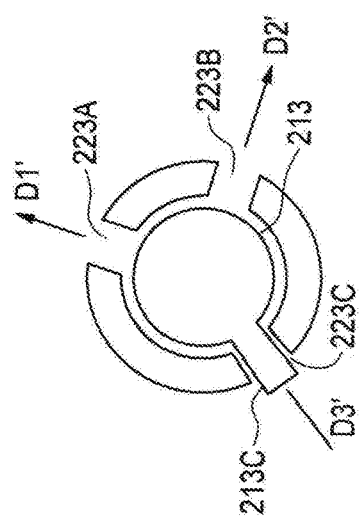
FIG. 8 is a schematic sectional view of an alternate arrangement where the component attachment element can b e positioned in any one of three different directions.

FIG. 8 schematically illustrates an alternate arrangement where one of the conduit mounting member and the nozzle member defines three slots 223A, 223B, and 223C such that the component attachment element 213C of the component mounting member 213 can be located in any one of the three slots to orient a corresponding solenoid or like sprayer element in a selected one of three different directions D1', D2', and D3'.

It is also contemplated that the nozzle apparatus 1 can be configured such that the component mounting member can be oriented in four, five, or virtually any number of different directions.

The nozzle apparatus 1 of the present disclosure provides added flexibility for positioning of sprayer components 15 such as solenoid valves and the like.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A sprayer apparatus comprising:
   a sprayer boom assembly extending laterally from a spray vehicle configured to move in an operating travel direction, the sprayer boom assembly comprising a boom structure and a liquid conduit mounted along the boom structure;
   a conduit mounting member comprising a conduit input connected to the liquid conduit such that liquid passing through the liquid conduit flows into the conduit input and out through a conduit output of the conduit mounting member;
   a component mounting member comprising a component input releasably connected to the conduit output, the component mounting member further comprising a component attachment element and component output;
   a sprayer component connected to the component attachment element such that liquid passing out the conduit output flows into the component input then through the sprayer component to the component output;
   wherein the component mounting member is connectable to the conduit output in a first orientation where the sprayer component extends from the conduit output in a first direction, and is connectable to the conduit output in a second orientation where the sprayer component extends from the conduit output in a second direction that is different from the first direction;
   a nozzle member connected to the component mounting member such that liquid flowing out through the component output flows into a nozzle member input and out of the nozzle member through a nozzle mounted in the nozzle member.

2. The apparatus of claim 1 wherein the sprayer boom assembly is oriented substantially perpendicular to the operating travel direction, wherein the first direction is substantially perpendicular to the operating travel direction and the second direction is substantially perpendicular to the operating travel direction and oriented at an angle with respect to the first direction.

3. The apparatus of claim 2 wherein the angle is about 180 degrees.

4. The apparatus of claim 3 wherein the first and second directions are substantially horizontal.

5. The apparatus of claim 1 wherein the component input and the component output are substantially aligned, and wherein the component attachment element extends laterally from the aligned component input and component output.

6. The apparatus of claim 5 wherein one of the conduit mounting member and the nozzle member define first and second slots, and wherein the component mounting member is connected to the conduit output in the first orientation by positioning the component attachment element in the first slot, and wherein the component mounting member is connected to the conduit output in the second orientation by positioning the component attachment element in the second slot.

7. The apparatus of claim 6 wherein the component input and the component output are substantially aligned in a direction parallel to the operating travel direction.

\* \* \* \* \*